United States Patent [19]

Rossi

[11] 4,346,290

[45] Aug. 24, 1982

[54] DEVICE FOR THE RECOGNITION AND PROGRESSIVE CANCELLATION OF INFORMATION RECORDED ON A MAGNETIC SUPPORT

[76] Inventor: Mario Rossi, corso Vittorio Emanuele 74, Turin, Italy

[21] Appl. No.: 60,766

[22] Filed: Jul. 26, 1979

Related U.S. Application Data

[63] Continuation of Ser. No. 878,577, Feb. 16, 1978.

[30] Foreign Application Priority Data

Mar. 4, 1977 [IT] Italy .............................. 67474 A/77

[51] Int. Cl.³ ........................ G06K 7/08; G06K 19/08
[52] U.S. Cl. .................................... 235/436; 235/449; 235/479
[58] Field of Search ...................... 235/436, 449, 476; 360/2

[56] References Cited

U.S. PATENT DOCUMENTS

| | | | |
|---|---|---|---|
| 3,743,134 | 7/1973 | Constable et al. | 235/436 |
| 3,914,789 | 10/1975 | Coker, Jr. et al. | 360/2 |
| 3,935,933 | 2/1976 | Tanaka et al. | 235/436 |
| 3,946,206 | 3/1976 | Darjany | 235/436 |
| 3,949,193 | 4/1976 | Dowdell | 360/43 |
| 3,982,103 | 9/1976 | Goldman | 235/436 |
| 4,017,857 | 4/1977 | Evans, Jr. et al. | 235/436 |
| 4,024,379 | 5/1977 | Pfost et al. | 235/436 |
| 4,044,331 | 8/1977 | Garofolz, Jr. et al. | 235/436 |

Primary Examiner—Vincent P. Canney
Attorney, Agent, or Firm—Michael J. Striker

[57] ABSTRACT

An enablement system for vending machines and the like generates an enablement signal, which can be applied to such vending machine, upon reading of a credit card provided with only a single magnetic data track, and the enablement system has merely a one-track capability. The card's track contains, in sequence, a series of warm-up "1" bits, followed by a series of "0" and "1" bits together identifying the card as a valid card, followed by a series of "1" bits each of which signifies one permitted use of the card, followed by a final "0" bit. Each time the card is used, when the final "0" bit reaches the system's reading head, the immediately preceding "1" bit is converted to a "0" bit, this causing the number of such "1" bits to progressively decrease. This permits an inexpensive one-track capability, while yet affording both validity-identification and also number-of-uses updating capability; and furthermore permits both read and write operations during a single unidirectional pass of the card past the system's read-write head. The system lacks expensive card-transport motor systems, and the card is moved manually. The system's read winding applies its card-responsive pulses to an amplifier having automatic gain control, whereby the aforementioned series of warm-up "1" bits on the card, having no data significance, serve to set the amplifier to a gain value compensating for the slower than normal or faster than normal speed of manual insertion or removal of the card, so that the read and write operations can be properly performed despite the absence of a motor-referenced time base and despite the absence of a synthetic time base of the type which conventionally requires the use of synchronizing bits on a separate second track, which the present system successfully avoids.

5 Claims, 4 Drawing Figures

DEVICE FOR THE RECOGNITION AND PROGRESSIVE CANCELLATION OF INFORMATION RECORDED ON A MAGNETIC SUPPORT

This is a continuation of application Ser. No. 878,577, filed Feb. 16, 1978.

BACKGROUND OF THE INVENTION

1. Field of the Invention

This invention pertains to a manually-operable device which can be used to read information which is encoded in magnetic form on a credit card, and which can update the information after it has been read.

2. Description of the Prior Art

Credit cards have been employed in two different fashions in the past. In the first fashion, information recorded on the credit card is read only once, in order to allow access to whatever service is desired. In this first fashion, use of the credit card at any individual point is not restricted by information on the credit card itself, but is rather imposed by external independent means.

In the second fashion, the credit card not only contains information which allows access to services, but also contains use information which imposes a limitation on use of the credit card without requiring such external independent means. In this second fashion, the use information is updated by writing updated use information on the card itself.

If a credit card is to be used in the first fashion described above, a manually operable reader may be used, since it is only necessary to move a magnetic strip underneath a read head and suitable electronic means may be utilized to read the information recorded on the credit card. However, if a credit card is to be used in the second fashion, it is not only necessary to provide a reader, but it is also necessary to provide a writer which will update the use information recorded on the credit card. In the prior art, a reader/writer of this type has always been motor driven, in order to insure a constant recording quality while the use information is updated by regulating credit card speed through the device. In the prior art, a motorized reader/writer utilizes two passes of the credit card through the device. In the first pass, key information is read to provide access to the service desired, while in the second pass the use information is updated. Provision of such a motor-driven device increases cost.

Therefore, it would be advantageous to provide a device which would not only read information magnetically encoded on a credit card but which would also update information thereon without requiring a motor, and which would operate as reliably as motor-driven devices.

SUMMARY OF THE INVENTION

These objects, along with others which will appear hereinafter, are achieved in this invention. A device is here disclosed which allows information which is magnetically encoded in digital form upon a credit card to be both read and updated without the use of motor to drive the card. In this invention, usable information is recorded upon a magnetic strip on a credit card in two parts. The first part is key information which identifies the card as valid. The second part is use information which contains the number of times that the credit card may be used. Each time the card is used, the use information is updated, so that after the credit card has been used for the predetermined number of times, the card will no longer be useful.

By use of this invention, a credit card may be used to operate a dispensing machine for a predetermined number of uses. After using the credit card for this predetermined number of uses, a user will be unable to operate the dispensing machine without resubmitting the credit card to the organization which originally provided it for recording more use information thereon.

This invention uses a card guide and a read-write head which form the mechanical components of the invention. The card guides a credit card (which is manually moved by a user) against the read-write head so that a magnetic strip on the credit card can be both read and rerecorded with updated information.

This information also utilizes an electronic interpreter which is connected to the read-write head and which enables the information recorded on the credit card to be read and updated. The information is recorded in a binary code on the magnetic strip on the credit card, and as will be seen hereinafter, the invention is virtually insensitive to changes in speed of the credit card caused by manual movement of the card by a user.

In this invention, the magnetic strip on the credit card contains information which falls into four groups. The first group is a preamble containing approximately ten binary zeroes. The second group of data is a sixteen bit binary word which is used as key data. The third group is a predetermined number of binary ones, which predetermined number corresponds to the number of uses remaining in the card. The fourth group initially includes one binary zero.

Initially, the invention reads the first group of data, and automatically adjusts its amplification so as to properly read data which is recorded on the credit card. After the invention has thus been warmed up, the key data is read and validates the card if the key data is correctly recorded. If the key data is indeed correct, the invention operates a dispensing machine. During such operation, the last binary one in the third group of data is updated and changed to a binary zero. Thus, instead of the original predetermined number of ones in the third group of data, the number of ones is decremented by one while two final binary zeroes are located in the fourth group of data. Each time the card is used, the last binary one in the third group of data is changed to a binary zero, until such time as the card has been used for the predetermined number of uses.

After the credit card has been thus used, the key data itself is mutilated so that the credit card is subsequently unusable.

DETAILED DESCRIPTION OF PREFERRED EMBODIMENTS

Figure 1:
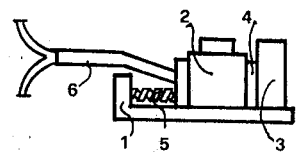
FIG. 1 is a side view of the read-write head and card guide.
Figure 2:
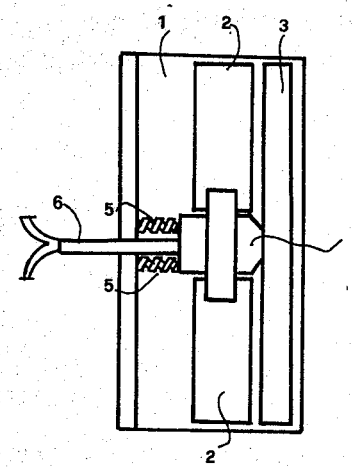
FIG. 2 is a plan view of the read-write head and card guide.
Figure 4:
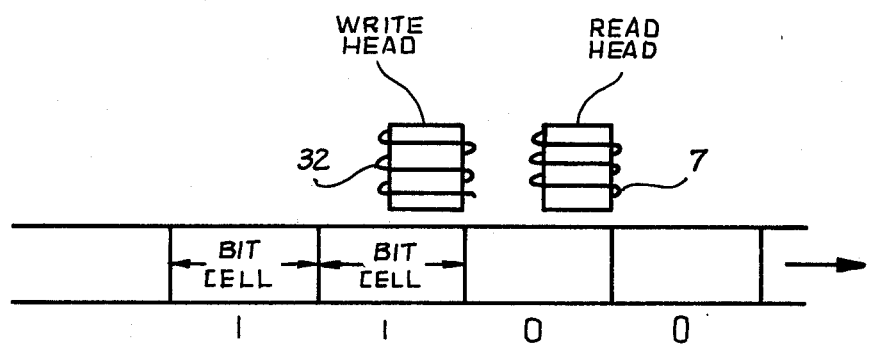
FIG. 4 depicts the read and write windings of the read-write head, relative to the direction of manually performed card transport.

Referring first to FIGS. 1 and 2, it can be seen that a base 1 supports guide member 2 and guide member 3 so as to define a passage in a card guide into which a credit card (not shown) may be inserted and in which the credit card may be moved downstream along a path. Magnetic single track read-write head 4 is slidably supported on guide member 2 so as to be movable towards and away from guide member 3 and any credit card guided thereagainst. Springs 5, which extend between support 1 and read-write head 4, serve to urge read-write head 4 toward guide member 3, so that read-write head 4 will be intimately connected with a magnetic strip on the credit card, to enable information recorded on the magnetic strip to be properly read and properly updated. Flexible leads 6 are connected to read-write head 4 to connect read-write head 4 to the interpreter disclosed below. Read-write head 4 includes a read winding 7 and a write winding 32 which, as shown in FIG. 4, are spaced apart in the direction of manually performed transport of a credit card.

Figure 3:
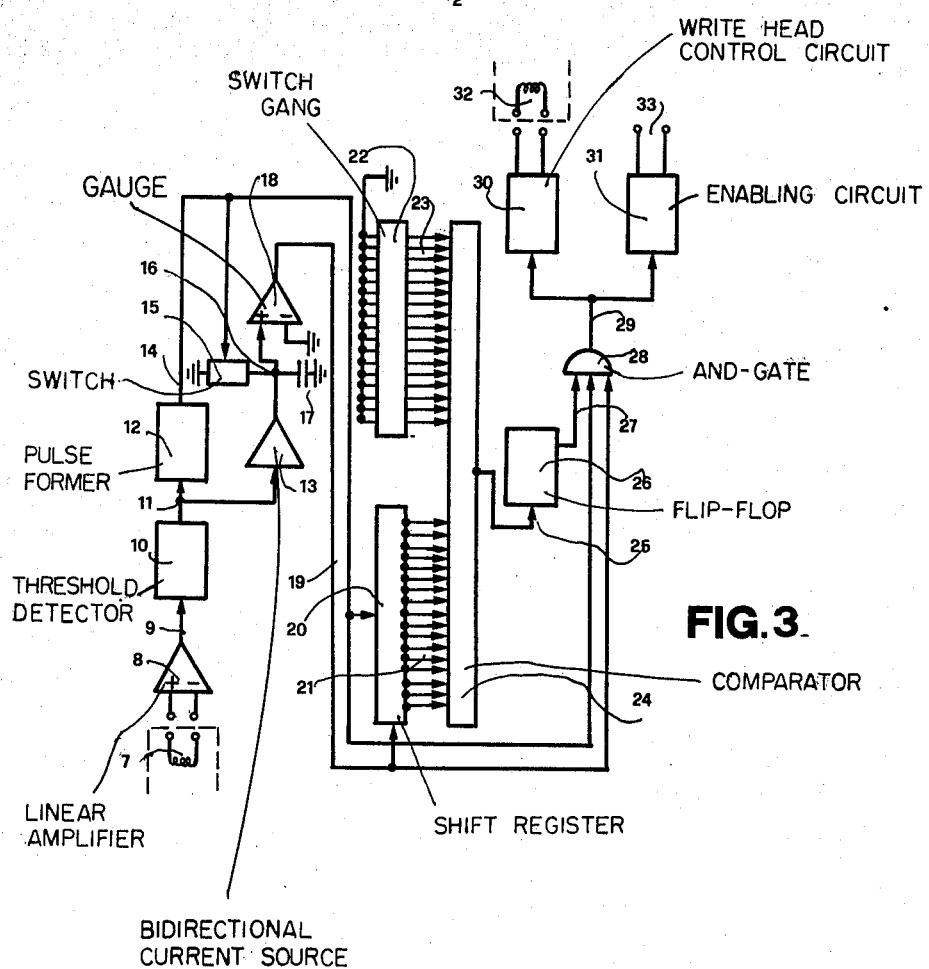
FIG. 3 is a block diagram of the interpreter which is utilized in this invention.

Referring now to FIG. 3, it can be seen that read winding 7 of read-write head 4 is connected to the inputs of linear amplifier 8. Linear amplifier 8 incorporates an automatic gain control that insures a constant signal amplitude at line 9, thereby making the rest of the circuitry disclosed independent of fluctuations in amplitude from read winding 7 and thus insensitive to variations in credit card speed. Line 9 from linear amplifier 8 is connected to threshold detector 10. Threshold detector 10 produces a digital signal at line 11 in such a fashion that the digital signal changes polarity with each flux transition read by read winding 7.

Line 11 is connected to pulse former 12. Pulse former 12 generates a digital pulse upon receipt of the leading flank of each signal produced by threshold detector 10.

Line 11 is also connected to bidirectional current source 13. Bidirectional current source 13 has an output line 16, which line 16 is connected to one plate of capacitor 17. The other plate of capacitor 17 is grounded. It can thus be seen that capacitor 17 will either be charged by a logically high output from bidirectional current source 13, or discharged by a logically low output therefrom. The magnitudes of such charging and discharging will be equal. Moreover, since the output from threshold detector 10 changes polarity at each flux transition detected by read winding 7, the voltage across capacitor 17 will be positive in the event that a zero bit is read by read winding 7 and will be negative in the event that a one bit is read by read winding 7.

Line 14 from pulse former 12 is connected to switch 15. Switch 15 connects output 16 of bidirectional current source 13 to ground when switch 15 is turned on, and isolates output 16 from ground when switch 15 is turned off. Each time that pulse former 12 develops an output at line 14, i.e. each time a new bit is read, switch 15 will ground the undergrounded plate of capacitor 17 and will thereby bring the charge across it to zero. After capacitor 17 has been charged either positively or negatively, depending upon the output from bidirectional current source 13 and thus upon the logical state of the bit being read, the voltage across capacitor 17 is reflected at the non-inverting input of comparator 18. After the bit has been read, the electrical data signal from comparator 18 (which appears at line 19) will reflect the logical state of the bit. Inasmuch as line 19 is connected to the data input of 16-bit shift register 20, shift register 20 is serially loaded bit-by-bit with the information recorded on the credit card, as such information is read.

The sixteen parallel data outputs 21 of shift register 20 are connected to comparator 24. Additionally, the sixteen parallel data outputs 23 of switch gang 22 are also connected to comparator 24. Switch gang 22 is set so that it provides the key information which identifies a valid card. Only when the contents of shift register 20 correspond with the key information located in shift register 22 will comparator 24 produce a logically high output at line 25.

Line 25 is connected to the input of flipflop 26. The output of flipflop 26 is connected to an input of AND-gate 28 via line 27. Similarly, both line 19 and line 14 are connected to two other inputs of AND-gate 28. The output of AND-gate 28 appearing at line 29 will only be logically high when all three of the inputs of ANd-gate 28 are logically high. Line 19 will only be logically high when a zero bit has just been read; line 27 will only be logically high when the information in shift register 20 matches the key information stored in switch gang 22; and line 14 will only be logically high when the reading of a bit has taken place. Thus, a high output from AND-gate 28 corresponds to a reading of the final zero bit in the fourth group of data recorded on the credit card.

When the output of AND-gate 28 at line 29 is logically high, enabling circuit 31 is energized to generate an enabling signal at output 33, which enabling signal can be used to operate a dispensing machine. Additionally, write head control circuit 30 will also be energized to generate an electrical update signal, energizing write winding 32 to write a zero bit one bit ahead of the previous final zero bit in the fourth group of data recorded upon the credit card.

I claim:

1. An improved apparatus of the type employed to generate an enablement signal used to enable operation of a dispensing machine or the like under the control of data magnetically recorded in a single data track on the magnetic strip of a credit card, the data on the magnetic strip including key data identifying the card as a valid one and number-of-permitted-uses data identifying the number of times the credit card is to be permitted to enable operation of a dispensing machine, the improved apparatus comprising, in combination, a guide structure defining a path for manual transport of a credit card along said path; a read-write head unit including magnetic data reading means and magnetic data-writing means located along said path so that the magnetic strip of a manually inserted card pass along the read-write head unit during the manual transport of the card in said path, the magnetic data reading means being operative during the manual transport of the card for converting magnetically recorded data present on the strip into read out electrical signals, signal-evaluating means connected to receive the read out electrical signals from the magnetic data reading means and operative for recognizing the key data despite the unpredetermined speed of the manual transport of the card relative to the head unit and furthermore ascertaining, despite the unpredetermined transport speed, whether the number-of-permitted-uses data indicate exhaustion of the number of permitted uses of the card, and including enablement-signal-generating means operative, in response to recognition of the key data accompanied by ascertainment that the number of permitted uses is not yet exhausted, for generating an enablement signal for enabling an automatic dispensing machine; and updating means operative during manually performed transport of the card past the head unit for causing the magnetic writing means to write upon the magnetic strip in a manner updating the number-of-permitted-uses data to cause the number-of-permitted-uses data to represent a decreased number of permitted uses, and wherein the signal-evaluating means comprises means defining a signal transmission path for the electrical signals produced by the magnetic data reading means, the signal transmission path including amplifier means with automatic amplification control operative for stabilizing the signal level of signals transmitted in the signal transmission path against the influence of variations in the manual transport speed of the credit card past the read-write head unit, and wherein the apparatus further comprises a credit card having a magnetic strip on which are recorded key data identifying the card as a valid one and number-of-permitted-uses data identifying the number of times the credit card is to be honored, and on which are furthermore recorded a series of bits spatially located in the card such that the series of bits reaches the read-write head unit prior to the key data and prior to the number-of-permitted-uses data, whereby the amplifier means with automatic amplification control can begin to adapt itself to the speed of manual transport of the credit card by responding to the electrical signals derived by the magnetic reading means from said series of bits.

2. An improved apparatus of the type employed to generate an enablement signal used to enable operation of a dispensing machine or the like under the control of data magnetically recorded in a single data track on the magnetic strip of a credit card, the data on the magnetic strip including key data identifying the card as a valid one and number-of-permitted-uses data identifying the number of times the credit card is to be permitted to enable operation of a dispensing machine, the improved apparatus comprising, in combination, a guide structure defining a path for manual transport of a credit card along said path; a read-write head unit including magnetic data reading means and magnetic data-writing means located along said path so that the magnetic strip of a manually inserted card pass along the read-write head unit during the manual transport of the card in said path, the magnetic data reading means being operative during the manual transport of the card for converting magnetically recorded data present on the strip into read out electrical signals, signal-evaluating means connected to receive the read out electrical signals from the magnetic data reading means and operative for recognizing the key data despite the unpredetermined speed of the manual transport of the card relative to the head unit and furthermore ascertaining, despite the unpredetermined transport speed, whether the number-of-permitted-uses data indicate exhaustion of the number of permitted uses of the card, and including enablement-signal-generating means operative, in response to recognition of the key data accompanied by ascertainment that the number of permitted uses is not yet exhausted, for generating an enablement signal for enabling an automatic dispensing machine; and updating means operative during manually performed transport of the card past the head unit for causing the magnetic writing means to write upon the magnetic strip in a manner updating the number-of-permitted-uses data to cause the number-of-permitted-uses data to represent a decreased number of permitted uses, and wherein the magnetic data reading means consisting of a one-track magnetic data reader capable of reading only one bit at a time, whereby the magnetic strip on the credit card need by provided with a single bit track, the signal-evaluating means comprising means for ascertaining from the series of single bits represented by the electrical signals generated by the one-track data reader the presence of a predetermined serial combination of bits constituting predetermined key data which must be present on the magnetic strip as a condition precedent to generation of the enablement signal, the signal-evaluating means furthermore including means for ascertaining subsequent in time to the ascertainment of the presence of the predetermined key data the presence of a first-value bit indicating that the number of permissible uses has not been exhausted followed by a second-valut bit of binary value different from the first-value bit, the enablement-signal-generating means comprising means responding to the ascertainment of the key data followed in time by the ascertainment of the first-value bit and then the second-value bit by generating the enablement signal, the updating means responding to the ascertainment of the key data followed in time by the ascertainment of the first-value bit and then the second-value bit by activating the magnetic writing means to cause the latter to replace the first-value bit with a second-value bit, whereby if the bit track contains, considered in the direction of manual card transport, the key data bits followed by a series of first-value bits followed by at least one second-value bit, then each manual passage of the card through the apparatus will cause the number of second-value bits to progressively increase and the number of first-value bits to progressively decrease.

3. An improved apparatus of the type employed to generate an enablement signal used to enable operation of a dispensing machine or the like under the control of data magnetically recorded in a single data track on the magnetic strip of a credit card, the data on the magnetic strip including key data identifying the card as a valid one and number-of-permitted-uses data identifying the number of times the credit card is to be permitted to enable operation of a dispensing machine, the improved apparatus comprising, in combination, a guide structure defining a path for manual transport of a credit card along said path; a read-write head unit including magnetic data reading means and magnetic data-writing means located along said path so that the magnetic strip of a manually inserted card pass along the read-write head unit during the manual transport of the card in said path, the magnetic data reading means being operative during the manual transport of the card for converting magnetically recorded data present on the strip into read out electrical signals, signal-evaluating means connected to receive the read out electrical signals from the magnetic data reading means and operative for recognizing the key data despite the unpredetermined speed of the manual transport second-value bit is detected the resulting activation of the magnetic writing means causes the first-value bit located just upstream of the detected second-value bit to be converted into a second-value bit, whereby the magnetic recording operation required for updating is necessarily performed during the selfsame unidirectional manual card transport movement during which the key data are read by the one-track magnetic data reader, all reading and writing operations accordingly being performed during a unidirectional stroke of the credit card of the card relative to the head unit and furthermore ascertaining, despite the unpredetermined transport speed, whether the number-of-permitted-uses data indicate exhaustion of the number of permitted uses of the card, and including enablement-signal-generating means operative, in response to recognition of the key data accompanied by ascertainment that the number of permitted uses is not yet exhausted, for generating an enablement signal for enabling an automatic dispensing machine; and updating means operative during manually performed transport of the card past the head unit for causing the magnetic writing means to write upon the magnetic strip in a manner updating the number-of-permitted-uses data to cause the number-of-permitted-uses data to represent a decreased number of permitted uses, and wherein the magnetic data reading means comprises a one-track magnetic data reader capable of reading only one bit at a time, whereby the magnetic strip on the credit card need by provided with a signal bit track, the signal-evaluating means comprising means for ascertaining from the series of single bits represented by the electrical signals generated by the one-track data reader the presence of a predetermined serial combination of bits constituting predetermined key data which must be present on the magnetic strip as a condition precedent to generation of the enablement signal, the signal-evaluating means furthermore including means for ascertaining subsequent in time to the ascertainment of the presence of the predetermined key data the presence of a first-value bit indicating that the number of permissible uses has not been exhausted followed by a second-value bit of binary value different from the first-value bit, the enablement-signal-generating means comprising means responding to the ascertainment of the key data followed in time by the ascertainment of the first-value bit and then the second-value bit by generating the enablement signal, the updating means responding to the ascertainment of the key data followed in time by the ascertainment of the first-value bit and then the second-value bit by activating the magnetic writing means to cause the latter to replace the first-value bit with a second-value bit, whereby if the bit track contains, considered in the direction of manual card transport, the key data bits followed by a series of first-value bits followed by at least one second-value bit, then each manual passage of the card through the apparatus will cause the number of second-value bits to progressively increase and the number of first-value bits to progressively decrease, and wherein the magnetic writing means is located upstream of the one-track magnetic data reader as considered in the direction of manual card transport by a distance such that when the second-value bit is detected the resulting activation of the magnetic writing means causes the first-value bit located just upstream of the detected second-value bit to be converted into a second-value bit, whereby the magnetic recording operation required for updating is necessarily performed during the selfsame unidirectional manual card transport movement during which the key data are read by the one-track magnetic data reader, all reading and writing operations accordingly being performed during a unidirectional stroke of the credit card.

4. An improved apparatus of the type employed to generate an enablement signal used to enable operation of a dispensing machine or the like under the control of data magnetically recorded in a single data track on the magnetic strip of a credit card, the data on the magnetic strip including key data identifying the card as a valid one and number-of-permitted-uses data identifying the number of times the credit card is to be permitted to enable operation of a dispensing machine, the improved apparatus comprising, in combination, a guide structure defining a path for manual transport of a credit card along said path; a read-write head unit including magnetic data reading means and magnetic data-writing means located along said path so that the magnetic strip of a manually inserted card pass along the read-write head unit during the manual transport of the card in said path, the magnetic data reading means being operative during the manual transport of the card for converting magnetically recorded data present on the strip into read out electrical signals, signal-evaluating means connected to receive the read out electrical signals from the magnetic data reading means and operative for recognizing the key data despite the unpredetermined speed of the manual transport of the card relative to the head unit and furthermore ascertaining, despite the unpredetermined transport speed, whether the number-of-permitted-uses data indicate exhaustion of the number of permitted uses of the card, and including enablement-signal-generating means operative, in response to recognition of the key data accompanied by ascertainment that the number of permitted uses is not yet exhausted, for generating an enablement signal for enabling an automatic dispensing machine; and updating means operative during manually performed transport of the card past the head unit for causing the magnetic writing means to write upon the magnetic strip in a manner updating the number-of-permitted-uses data to cause the number-of-permitted-uses data to represent a decreased number of permitted uses, and wherein the bit recognition means comprises a totalizer element and totalizer-control means responding to the successive electrical signals produced by the reading means for alternately increasing and decreasing the value of the electrical quantity registered by the totalizer element and means automatically resetting the totalizer element each time the value of the electrical quantity registered by the totalizer element has been one time increased and one time decreased.

5. An improved apparatus of the type employed to generate an enablement signal used to enable operation of a dispensing machine or the like under the control of data magnetically recorded in a single data track on the magnetic strip of a credit card, the data on the magnetic strip including key data identifying the card as a valid one and number-of-permitted-uses data identifying the number of times the credit card is to be permitted to enable operation of a dispensing machine, the improved apparatus comprising, in combination, a guide structure defining a path for manual transport of a credit card along said path; a read-write head unit including magnetic data reading means and magnetic data-writing means located along said path so that the magnetic strip of a manually inserted card pass along the read-write head unit during the manual transport of the card in said path, the magnetic data reading means being operative during the manual transport of the card for converting magnetically recorded data present on the strip into read out electrical signals, signal-evaluating means connected to receive the read out electrical signals from the magnetic data reading means and operative for recognizing the key data despite the unpredetermined speed of the manual transport of the card relative to the head unit and furthermore ascertaining, despite the unpredetermined transport speed, whether the number-of-permitted-uses data indicate exhaustion of the number of permitted uses of the card, and including enablement-signal-generating means operative, in response to recognition of the key data accompanied by ascertainment that the number of permitted uses is not yet exhausted, for generating an enablement signal for enabling an automatic dispensing machine; and updating means operative during manually performed transport of the card past the head unit for causing the magnetic writing means to write upon the magnetic strip in a manner updating the number-of-permitted-uses data to cause the number-of-permitted-uses data to represent a decreased number of permitted uses, and wherein the apparatus defined in claim 1, the bit recognition means comprising a totalizer element and totalizer-control means responding to the successive electrical signals produced by the reading means for alternately increasing and decreasing the value of the electrical quantity registered by the totalizer element and means automatically resetting the totalizer element each time the value of the electrical quantity registered by the totalizer element has been one time increased and one time decreased, and wherein the totalizer element comprises a condenser, the totalizer-control means being a reversible-polarity current source operative for alternately charging and discharging the condenser, the resetting means comprising means discharging the condenser each time the condenser has been both charged and discharged by the current source, and furthermore including means ascertaining from the voltage on the condenser whether the bit being read is a "zero" or a "one", whereby even if the speed of manual transport of the card varies from the reading of one bit to the next the length-modulated "zero" and "one" bits can be reliably distinguished.

* * * * *